United States Patent [19]

Wookey et al.

[11] 3,930,048

[45] Dec. 30, 1975

[54] SWEETENING MATERIAL AND METHOD FOR MANUFACTURING THE SAME

[75] Inventors: Norman Wookey, Epsom; Arthur Frederick Jackson, Ashford; Michael Clive Collins, Hamstreet; Brian Francis, Faversham, all of England

[73] Assignee: Ranks Hovis McDougall Limited, London, England

[22] Filed: Jan. 9, 1974

[21] Appl. No.: 431,699

[30] Foreign Application Priority Data

Jan. 17, 1973 United Kingdom................ 2501/73

[52] U.S. Cl. .............................................. 426/548
[51] Int. Cl.² ....................................... A23L 1/236
[58] Field of Search ....... 426/213, 217, 89, 96, 103, 426/380, 302, 453, 471, 285, 548

[56] References Cited

UNITED STATES PATENTS

| | | | |
|---|---|---|---|
| 3,704,138 | 11/1972 | La Via et al..................... | 426/471 X |
| 3,795,746 | 3/1974 | Walton ................................ | 426/96 |

Primary Examiner—A. Louis Monacell
Assistant Examiner—Esther L. Massung
Attorney, Agent, or Firm—Stevens, Davis, Miller & Mosher

[57] ABSTRACT

A sweetening material comprising dextrose and a synthetic sweetening agent, said material having a sweetening power substantially equivalent to that of sugar but of low bulk density and low calorific value. It may be produced by spray drying of syrup and powder to form agglomerates which are separated by size.

12 Claims, No Drawings

SWEETENING MATERIAL AND METHOD FOR MANUFACTURING THE SAME

This invention relates to sweetening materials comprising dextrose and a synthetic sweetening agent, and is concerned with the production of materials having low calorific value per unit of volume.

It has been found that a sweetening material other than pure sugar is more often acceptable to the public if its physical form and apparent bulk approximate to that of sugar. There are advantages in producing a low calorie sugar analogue which can be measured and used in the same manner as sugar, e.g., by the spoonful.

The present invention has for its principal objective, the production of a material which will have an apparent bulk and physical appearance analogous to those of granulated sugar; which will possess substantially equivalent sweetening power to that of sugar, but which will have a bulk density which is considerably below that of granulated sugar and a consequently low calorific value in relation to its apparent bulk.

According to the present invention, there is provided a sweetening material in the form of porous agglomerates of spraydried particles, and in which the essential constituents are dextrose and a synthetic sweetening agent, such material having a substantially equivalent sweetening power to that of granulated sugar but a bulk density in the range of 0.2 to 0.75 gm/cc (as compared with about 0.9 gm/cc of granulated sugar) and a consequently low calorific value per unit of volume.

Preferably the synthetic sweetening agent itself has a sweetening power not less than thirty times as great as that of granulated sugar.

The size of the agglomerates preferably lies within the size range 6 to 22 mesh (British Standard Specification for test sieves — B.S. 410: 1969).

The synthetic sweetening agent may be cyclohexylsulphamic acid or a salt thereof, or saccharine or a salt thereof, or a mixture of any one of the foregoing with any other or others of them.

It has already been suggested in U.K. Specification No. 977,482 to provide, as a new composition of matter, crystals of a sugar having an adherent coating of synthetic sweetening agent of sweetening power greater than the sugar. By contrast, the product provided by this present invention comprises agglomerates of amorphous particles, resulting from manufacture by a spray drying process.

In one form, the sweetening material of this invention may comprise agglomerates of amorphous spray-dried particles, derived from a mixture of dextrose syrup and the synthetic sweetening agent.

A method of producing such a sweetening material includes the steps of feeding to a spray drier a mixture comprising dextrose and the synthetic sweetening agent, such mixture being in the liquid phase in the form of a water-based syrup and in the solid phase in the form of powder; contacting the syrup and powder as it passes through the spray drier whereby all or most of the powder particles will pick up some of the syrup and will become sticky, and will agglomerate together while drying and screening the spray dried material so as to separate any unagglomerated powder, together with the agglomerates which are above and below a predetermined range of screen sizes, from the intermediate sized remainder; which constitutes the end product.

For commercial production such method is continuous, in which case the oversized and undersized agglomerates are pulverized after separation to reduce them to powder which, together with any unagglomerated powder may be recycled through the spray drier and will then constitute all or part of the powder supply thereto.

Alternatively, all or part of the separated material (comprising the oversized and undersized agglomerates and any unagglomerated powder) may be mixed with the water to form syrup and then recycled through the spray drier, so as to constitute all or part of the syrup supply thereto.

In a modification of the above described methods, some of the material supplied to the spray drier may be dextrose unmixed with synthetic sweetening agent. Such unmixed dextrose material may be in powder form, or in the form of water based syrup or both.

Preferably, the proportions by weight of the starting material lie within the following ranges:

Dextrose 10 to 900 parts
Synthetic sweetening agent 1 part.

An alternative form of the sweetening material of this invention may comprise agglomerates of amorphous spray dried dextrose particles, such agglomerates being at least partially coated with the synthetic sweetening agent.

A method of producing this alternative sweetening material includes the steps of feeding water based dextrose syrup and dextrose powder into a spray drier; contacting the syrup and powder as it passes through the spray drier whereby all or most of the powder particles will pick up some of the syrup and will become sticky and will agglomerate together while drying; screening the spray dried material so as to separate unagglomerated powder, together with agglomerates which are above and below a predetermined range of screen sizes, from the intermediate sized remainder; spraying the intermediate sized agglomerates with liquid synthetic sweetening agent to give them at least a partial coating and finally drying the coated agglomerates to form the end product.

When such method is continuous, as in commercial production, the oversized and undersized agglomerates are pulverized, after separation, to reduce them to powder. This powder together with any unagglomerated powder, may be recycled through the spray drier and constitutes all or part of the powder supply thereto.

Alternatively, all or part of the separated material comprising the oversized and undersized agglomerates and any unagglomerated powder may be mixed with water to form syrup and recycled through the spray drier, so as to constitute all or part of the syrup supply thereto.

The following two examples will explain in greater detail two ways of carrying the invention into effect. In both cases the apparatus used was a "Niro" (Trade Mark) spray drier having recycle equipment attached which comprises a recycle fan and ducting to return powder to the top of the spray drier. Screening was effected by a Locker screen using 8 and 23 British Standard Industrial Wire Mesh screen sizes (medium class) — British Standard Specification 481: Part 1: 1971). The Examples are, of course, to be considered as illustrative and in no way limitative of the invention.

EXAMPLE 1

A continuous supply of dextrose syrup of 94 D.E. mixed with 0.45 percent (by weight) of saccharine is fed into the upper part of the spray drier. At the start, to "seed" agglomeration, a quantity of dextrose powder of 94 D.E. is injected for a period of about 30 minutes while spraying with saccharine solution to bring the circulating powder up to the 0.45 percent concentration of saccharine. During the spray drying porous agglomerates will form, resulting from individual particles becoming sticky and cohering with other particles.

The rate of feed of syrup was about 0.5 tons per hour and the rate of feed of "seeding" powder was about 1.5 tons per hour.

As the agglomerates emerge from the spray drier they are first passed through a coarse screen, which removes "oversized" agglomerates above 7 mesh, (B.S. 410: 1969) and then passed through a second finer screen which collects intermediate sized agglomerates in the range 7–18 mesh size (B.S. 410:1969). These will form the end product. "Undersized" agglomerates, below 18 mesh size (B.S. 410: 1969), together with any unagglomerated powder pass through the finer screen.

The oversized and undersized agglomerates and any unagglomerated particles are collected and fed into the recycle circuit where they pass through the impeller (recycle fan) which reduces their size down to powder. This powder is continuously fed into the top of the spray drier where it constitutes a continuous supply of seeding material.

The intermediate sized porous agglomerates consist of cohering particles each comprising a mixture of dextrose and saccharine, and the product has a bulk density in the order of 0.30 gm/cc.

EXAMPLE 2

The procedure of Example 1 was followed except that the syrup input to the spray drier was dextrose only without any synthetic sweetening agent.

The intermediate sized agglomerates thus consisted of cohering particles of anhydrous dextrose. These agglomerates were sprayed with a saccharine solution and were then dried on a fluidized bed drier.

The resultant product was a mass of porous anhydrous dextrose agglomerates having at least a partial coating of saccharine some of which had penetrated into some of the interstices in each agglomerate.

The bulk density was given in the order of 0.40 gm/cc.

What is claimed is:

1. A sweetening material in the form of porous agglomerates of bonded amorphous spray-dried particles consisting essentially of a homogeneous mixture of dextrose present at a value of approximately 94 D.E. and a synthetic sweetening agent, said material having a substantially equivalent sweetening power to that of granulated sugar but a bulk density in the range of 0.2 to 0.75 gm/cc and a consequently low calorific value per unit of volume.

2. A sweetening material as clamied in claim 1, in which said synthetic sweetening agent has a sweetening power at least thirty times as great as that of granulated sugar.

3. A sweetening material as claimed in claim 1, in which said synthetic sweetening agent is cyclohexylsulphamic acid or a salt thereof, or saccharine or a salt thereof, or a mixture of any of the foregoing with any other or others of them.

4. A sweetening material as claimed in claim 1, having a bulk density lying within the range of 0.25 to 0.50 gm/cc.

5. A sweetening material as claimed in claim 1, comprising a plurality of amorphous spray dried agglomerates, each lying within the size range 6 to 22 mesh in British Standard Specification for test sieves.

6. A method of producing a sweetening material in the form of porous agglomerates of spray-dried particles in which the essential components are dextrose and a synthetic sweetening agent, said material having substantially equivalent sweetening power to that of granulated sugar but a bulk density in the range of 0.2 to 0.75 gm/cc with a consequent low calorific value per unit of volume which comprises feeding to a spray dryer (a) a liquid mixture comprising dextrose and said synthetic sweetening agent in the form of a water-base syrup and (b) a solid mixture in the form of powder of amorphous dextrose and said synthetic sweetening agent, contacting said syrup and said powder as said mixture passes through said spray dryer whereby all or most of the powder particles will pick up some of said syrup and will become sticky, and will agglomerate while drying;

screening said spray dried material so as to separate any unagglomerated powder together with agglomerates which are above and below a predetermined range of screen sizes, from the intermediate sized remainder and recovering the intermediate sized remainder.

7. A method as claimed in claim 6, which is continuous, and in which said oversized and undersized agglomerates are pulverized after separation to reduce them to powder, and recycling said last-mentioned powder, together with any of said unagglomerated powder through said spray drier, such recycled powder constituting all or part of the powder supply to said spray drier.

8. A method as claimed in claim 6, which is continuous and in which all or part of said separated material comprising the oversized and undersized agglomerates and any unagglomerated powder is mixed with water to form a syrup and said syrup is recycled through said spray drier, such recycled syrup constituting all or part of the syrup supply to said spray drier.

9. The method as claimed in claim 7, in which some of said material supplied to said spray drier is dextrose unmixed with said synthetic sweetening agent.

10. The method as claimed in claim 9, in which said unmixed dextrose is in powder form.

11. A method of producing sweetening material as claimed in claim 6 in which the proportions by weight of the starting material, lie within the following ranges:
Dextrose 10 to 900 parts
Synthetic sweetening agent 1 part.

12. A sweetening material as claimed in claim 1, in which for each part of said synthetic sweetening agent there are 10 to 900 parts of dextrose.

\* \* \* \* \*